US008452475B1

(12) United States Patent
West et al.

(10) Patent No.: US 8,452,475 B1
(45) Date of Patent: May 28, 2013

(54) SYSTEMS AND METHODS FOR DYNAMIC AIRCRAFT MAINTENANCE SCHEDULING

(75) Inventors: David J. West, Cedar Rapids, IA (US); Mark W. Johnson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 692 days.

(21) Appl. No.: 12/587,235

(22) Filed: Oct. 2, 2009

(51) Int. Cl.
*G06F 7/00* (2006.01)

(52) U.S. Cl.
USPC .......................... 701/29.1; 701/29.4; 701/31.6

(58) Field of Classification Search
USPC .... 701/3, 14, 29.3, 29.4, 29.1, 31.6; 340/945, 340/963–965, 971
See application file for complete search history.

(56) References Cited

U.S. PATENT DOCUMENTS

| | | | | |
|---|---|---|---|---|
| 4,675,675 | A | 6/1987 | Corwin et al. | |
| 5,778,381 | A | 7/1998 | Sandifer | |
| 5,890,079 | A | 3/1999 | Levine | |
| 6,195,676 | B1 | 2/2001 | Spix et al. | |
| 6,725,137 | B2 | 4/2004 | Eagleton et al. | |
| 6,732,027 | B2 * | 5/2004 | Betters et al. | 701/29.4 |
| 7,103,507 | B2 | 9/2006 | Gorinevsky et al. | |
| 7,110,778 | B2 | 9/2006 | Davis et al. | |
| RE39,618 | E | 5/2007 | Levine | |
| 7,260,505 | B2 | 8/2007 | Felke et al. | |
| 7,643,440 | B1 | 1/2010 | Johnson et al. | |
| 8,266,066 | B1 * | 9/2012 | Wezter et al. | 705/78 |
| 2003/0195678 | A1 * | 10/2003 | Betters et al. | 701/29 |
| 2004/0204805 | A1 * | 10/2004 | Betters et al. | 701/35 |
| 2005/0026609 | A1 * | 2/2005 | Brinkley et al. | 455/431 |
| 2006/0089846 | A1 | 4/2006 | Middlebrook | |
| 2006/0097854 | A1 * | 5/2006 | Basu et al. | 340/425.5 |
| 2007/0260374 | A1 * | 11/2007 | Morrison et al. | 701/35 |
| 2007/0260726 | A1 | 11/2007 | Rozak et al. | |
| 2008/0056479 | A1 | 3/2008 | Pang | |
| 2010/0125468 | A1 * | 5/2010 | Avery et al. | 705/7 |

* cited by examiner

*Primary Examiner* — Yonel Beaulieu
(74) *Attorney, Agent, or Firm* — Donna P. Suchy; Daniel M. Barbieri

(57) ABSTRACT

A system for scheduling aircraft maintenance includes communications electronics configured to receive data from systems onboard one or more aircraft while the aircraft are in flight. The system further includes computing electronics configured to receive the data from the communications electronics and to update a maintenance schedule for the one or more aircraft based on the received data.

27 Claims, 4 Drawing Sheets

SYSTEMS AND METHODS FOR DYNAMIC AIRCRAFT MAINTENANCE SCHEDULING

BACKGROUND

The present invention relates generally to the field of aircraft maintenance scheduling.

Conventional aircraft maintenance is based on a fixed schedule and includes performing maintenance activities based on fixed intervals (e.g., days, weeks, hours, etc.). These fixed schedules can lead to conducting maintenance prior or after when maintenance should be conducted for different aircraft equipment. For example, in some instances a fixed maintenance schedule may cause a part that is operating very well to be removed and replaced early.

Yet other conventional aircraft maintenance systems provide a maintenance manager responsible for many aircraft with a trend analysis and allow the maintenance manager to schedule service for the aircraft based on displayed trend results. As the number of aircraft in a fleet increases or as the "uptime" for each aircraft is demanded to be higher, it becomes more challenging and difficult for a maintenance manager to effectively schedule maintenance for the aircraft.

SUMMARY

One embodiment of the invention relates to a system for scheduling aircraft maintenance. The system includes communications electronics configured to receive data generated by a plurality of equipment onboard an aircraft. The communications electronics are configured to receive the data while the aircraft is in flight. The system further includes computing electronics configured to receive the data from the communications electronics and to update a maintenance schedule based on the received data. The maintenance schedule includes a scheduled maintenance appointment for each of the plurality of equipment for the aircraft. The computing electronics may be configured to update the maintenance schedule by adjusting a scheduled maintenance appointment for at least one of the plurality of equipment onboard the aircraft. The computing electronics may be configured to update the maintenance schedule by adding a maintenance task to a to-do list for the next scheduled maintenance appointment based on the received data. The data may include usage information for the plurality of equipment and the plurality of equipment may relate to a plurality of aircraft subsystems. The communications electronics and the computing electronics may further be configured to coordinate maintenance schedules for a plurality of aircraft (e.g., by resolving conflicts between scheduled for the plurality of aircraft based on data received from aircraft while in flight).

Another embodiment of the invention relates to a system for scheduling aircraft maintenance. The system includes communications electronics configured to receive data from systems onboard a plurality of aircraft while the aircraft are in flight. The system further includes computing electronics configured to receive the data from the communications electronics and to update a maintenance schedule for the plurality of aircraft based on the received data.

Another embodiment of the invention relates to a method for scheduling aircraft maintenance. The method includes receiving data from systems onboard a plurality of aircraft while the aircraft are in flight. The method further includes updating a maintenance schedule for the plurality of aircraft based on the received data.

Another embodiment of the invention relates to a system for scheduling aircraft maintenance. The system includes means for receiving data from systems onboard a plurality of aircraft while the aircraft are in flight. The system further includes means for updating a maintenance schedule for the plurality of aircraft based on the received data.

Another embodiment relates to a device for mounting in an aircraft. The device includes a first interface to avionics systems, a second interface to an onboard maintenance system, and a third interface to a wireless data communications electronics. The device further includes a processing circuit configured to log data available from at least the first and second interfaces and to cause the wireless data communications electronics to wirelessly transmit the logged data to a ground-based aircraft maintenance system during flight.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the Figures, systems and methods for scheduling aircraft maintenance are shown and described. A computerized maintenance system located on the ground is configured to receive data from systems onboard the aircraft while the aircraft are in flight. Using the received data, the computerized maintenance system is configured to dynamically update a maintenance schedule for one or more aircraft.

The computerized maintenance system may conduct one or more processing steps to determine how to update the maintenance schedule. The data received from systems of the aircraft may include fault information for one or more aircraft systems. When the computerized maintenance system receives the data including fault information, the computerized maintenance system can, for example, estimate the severity of the error and create or move the next maintenance appointment for the aircraft to the next time the aircraft is docked at a hub for the airline. The computerized maintenance system may use an expert system to predict when maintenance will be necessary for the aircraft. An expert system may also be configured to determine the severity of the fault and to make decisions regarding the maintenance schedule. For example, if an in-flight fault for an aircraft is determined to be severe, the expert system may check for maintenance times and parts available to repair the aircraft at the airport at which the aircraft will be landing. If another aircraft is scheduled to receive an available maintenance time or part, the expert system may determine that the severe fault takes priority over, for example, regularly scheduled maintenance and updates the maintenance schedule accordingly.

Figure 1:
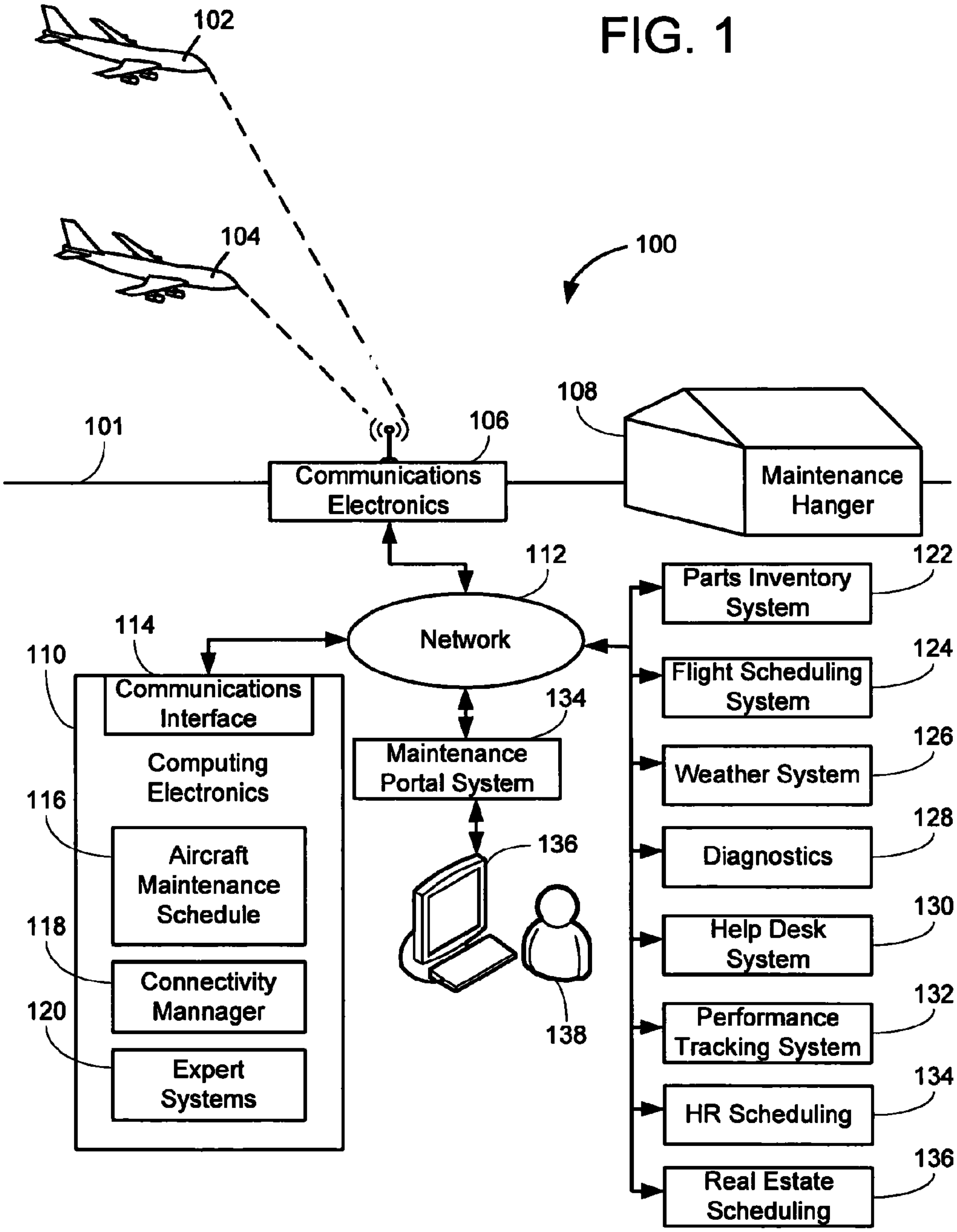
FIG. 1 is a block diagram of a system for scheduling aircraft maintenance, according to an exemplary embodiment.

Referring now to FIG. 1, a block diagram of a system 100 for scheduling aircraft maintenance is shown. System 100 is shown to include communications electronics 106 configured to receive data from systems onboard aircraft 102, 104 while the aircraft 102, 104 are in flight. System 100 further includes computing electronics 110 configured to receive the data from the communications electronics 106 and to update a maintenance schedule 116 for one or more of the plurality of aircraft based on the received data.

Advantageously, as aircraft 102, 104 are in flight, computing electronics 110 on the ground 101 may be updating an aircraft maintenance schedule 116. While computing electronics 110 may update a single aircraft maintenance schedule for a single aircraft (e.g., helicopter, airplane, prop plane, jet, military drone, etc.) or maintain a separate aircraft maintenance schedule for more than one aircraft, in other exemplary embodiments computing electronics 110 are configured to maintain the aircraft maintenance schedule for a plurality of aircraft in an integrated fashion. That is, computing electronics 110 may be configured to cause one or more scheduling updates for a second aircraft due to a determined aircraft update for a first aircraft.

With limited maintenance resources (e.g., one maintenance hanger 108 stall at an airport, limited human resources, limited parts resources, etc.), it may not be possible to service multiple aircraft at once. For example, as aircraft 102 and 104 are approaching an airport including maintenance hanger 108 (or other limited maintenance resources), computing electronics 110 may be configured to analyze data from both aircraft 102, 104 to determine if either aircraft are in need of maintenance resources. If either aircraft is in need of maintenance resources, computing electronics 110 will update aircraft maintenance schedule 116 (e.g., while the aircraft in need of maintenance is still in the air). Updating aircraft maintenance schedule 116 may include assigning an identifier for the aircraft to a particular date and time slot of the maintenance schedule 116. Updating the aircraft maintenance schedule 116 may also include or cause updating of other maintenance related systems or databases. For example, when computing electronics 110 updates aircraft maintenance schedule 116, the computing electronics 110 may also cause a parts inventory system 122 to be updated, a flight scheduling system 124 to be updated, a human resources (HR) scheduling system 134 to be updated, and/or a real estate scheduling system 136 to be updated. In an exemplary embodiment, however, computing electronics 110 are configured to coordinate maintenance data and maintenance activities for a plurality of connected systems. For example, when computing electronics 110 determines that aircraft 102 is in need of maintenance, computing electronics can conduct further communications with aircraft 102 to further analyze any faulty parts or systems of aircraft 102. Computing electronics 110 may then establish a comprehensive maintenance "plan" for aircraft 102. For example, computing electronics 110 may assign a date and time for maintenance of the aircraft 102, communicate with real estate scheduling system 136 to reserve maintenance hanger 108 for the date and time, communicate with HR scheduling 134 to assign a team (e.g., one or more maintenance managers or technicians) to conduct the maintenance during the date and time, communicate with the parts inventory system 122 to ship the proper parts to maintenance hanger 108 prior to the date and time of the maintenance, and communicate with flight scheduling system 124 to ensure that aircraft 102 is not scheduled to fly until after the maintenance is completed. Flights previously scheduled for aircraft 102 may be reassigned to other aircraft so that a minimum number of flights are cancelled.

A maintenance plan determined by computing electronics 110 may be communicated to a maintenance manager or other employee 138 via a maintenance portal system 134 in communication with a client 136. The maintenance portal system 134 may be configured to cause client 136 to display graphical user interfaces (GUIs) and to allow the maintenance manager 138 to accept, revise, or deny the maintenance plan proposed by computing electronics 110. Maintenance portal system 134 may be a stand-alone system configured to interface with computing electronics 110 in a distributed fashion (as shown) or maintenance portal system 134 may be integrated with computing electronics 110. Maintenance portal system 134 may cause GUIs to be displayed on client 136 that include, for example, fault or maintenance alerts for a plurality of aircraft, chat, voice, or video connections to maintenance experts, maintenance histories for a plurality of aircraft or parts, and work orders currently in progress, scheduled, and/or completed for a particular aircraft or a plurality of aircraft. Maintenance portal system 134 may further allow client 136 to request and display manuals for particular parts or aircraft, public or private "wiki" entries for the aircraft or parts at-issue, or information from any one or more of systems 122-136.

Communications electronics 106 are shown as being ground-based, but may be satellite-based in other exemplary embodiments. Communications electronics 106 may be distributed (e.g., a network of radio towers) or may be implemented at a single location for a single airport or other entities use. In some embodiments, communications electronics 106 are integrated with computing electronics 110 and/or take the place of communications interface 114. Communications electronics 106 may be configured to communicate using cellular communications technologies, VHF radio, Iridium satellite communications, or any other wireless data communications technology.

Communications electronics 106 are shown as communicably coupled to network 112 (e.g., Internet, WAN, LAN, etc.). In other exemplary embodiments, communications electronics 106 may be configured to communicate directly with communications interface 114 of computing electronics 110 (e.g., via wired or wireless communications). Computing electronics 110 may be located remotely from communications electronics 106 (e.g., at an airline maintenance headquarters).

Figure 4:
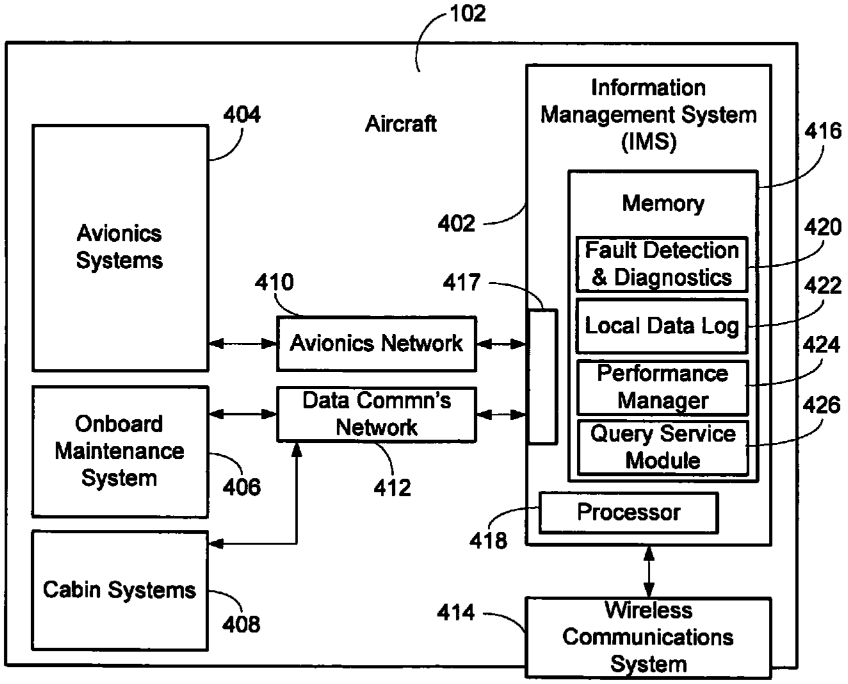
FIG. 4 is a block diagram of an aircraft system for use with exemplary scheduling systems of the present invention.

Each aircraft 102, 104 may include onboard systems configured to support the communications and computing activities of system 100. For example, each aircraft 102, 104 may include onboard systems as shown in FIG. 4 or otherwise. Computing electronics 110 are shown to include a connectivity manager 118 which may be a software module configured to include, for example, a data delivery client or server for managing the flow of information between the plurality of aircraft 102, 104 and computing electronics 110. Connectivity manager 118 may, for example, query aircraft and handle responses from the aircraft or may be configured to handle data "pushed" from the aircraft to the computing electronics 110. Connectivity manager 118 may further be configured to manage activities or hardware of communications interface 114 (e.g., which may include circuitry and/or drivers for operating communication electronics 106). Connectivity manager 118 may also be configured to handle authentication and security activities for computing electronics 110, ensuring that only authorized aircraft or communications sources are granted access to the data of computing electronics 110.

Computing electronics 110 are shown to include expert systems 120. Expert systems 120 may be or include one or more software systems configured to simulate a decision making process of an expert. Expert systems 120 may utilize inputs from the plurality of aircraft 102, 104, maintenance portal system 134, and/or any of systems 122-136 as inputs to decision making processes. Expert systems 120 may further include a knowledgebase and a knowledge engine configured to apply the plurality of inputs and the knowledgebase in a meaningful way. Computing electronics 110 may include other modules and components as shown and described, for example, in FIG. 3.

Figure 2A:
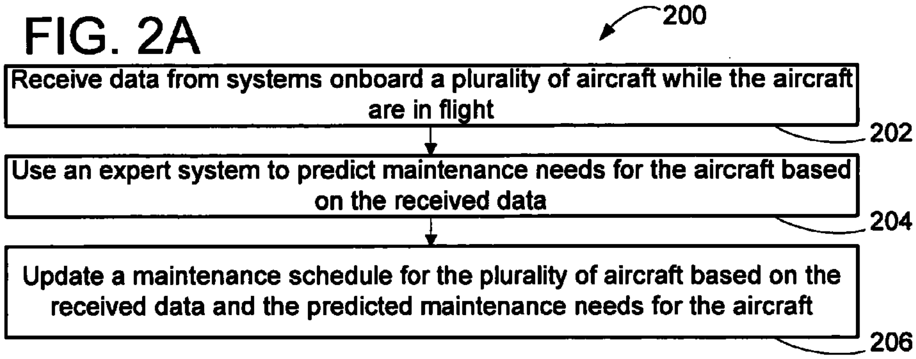
FIG. 2A is a flow chart of a process for scheduling aircraft maintenance, according to an exemplary embodiment.

Referring now to FIG. 2A, a flow chart of a process 200 for scheduling aircraft maintenance is shown, according to an exemplary embodiment. Process 200 is shown to include receiving data from systems onboard a plurality of aircraft while the aircraft are in flight (step 202). Process 200 is further shown to include using an expert system to predict maintenance needs for the aircraft based on the received data (step 204). While step 204 is shown to include using an expert system, it should be noted that other predictive systems may be used. Whether the prediction is conducted by an expert system or other processing system, the prediction may be completed using any type or number of prediction logic (e.g., model-based, statistical, forward-chaining, backward-chaining, etc.). Process 200 is further shown to include updating a maintenance schedule for the plurality of aircraft based on the received data and the predicted maintenance needs for the aircraft (step 206). As described above, updating the maintenance schedule may include any number of sub-steps or other related activities such as coordinating plans and resources with other maintenance-related systems (e.g., systems 122-136 shown in FIG. 1).

Figure 2B:
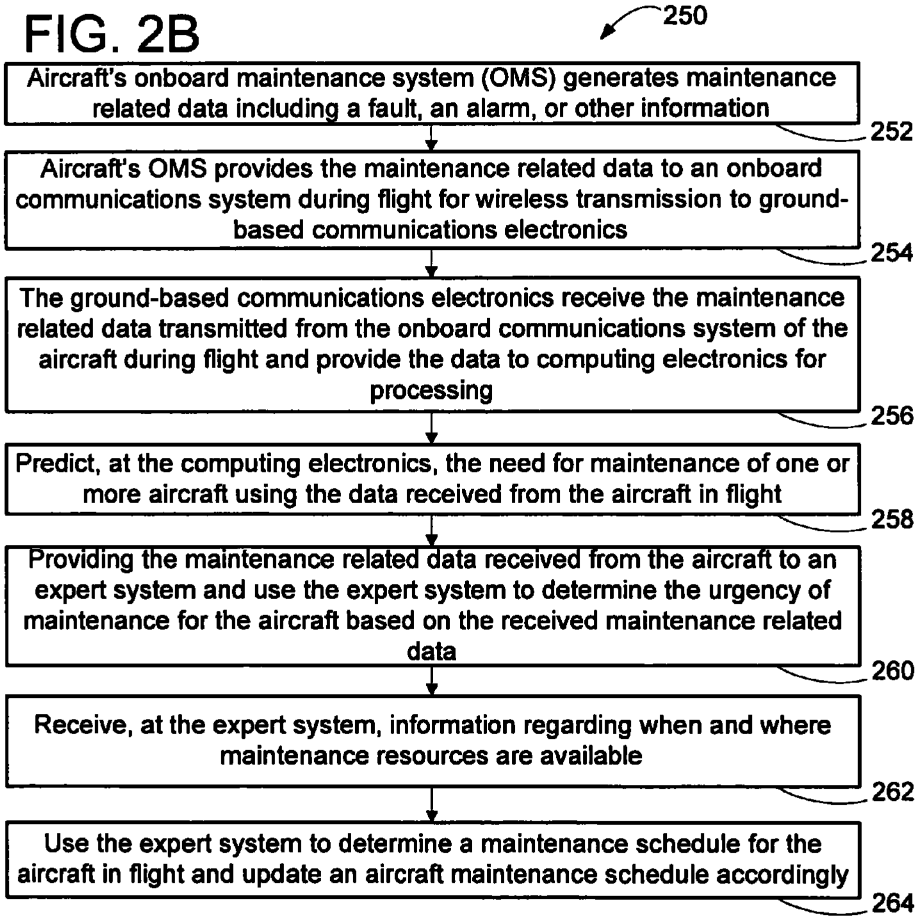
FIG. 2B is a more detailed flow chart of a process for scheduling aircraft maintenance, according to another exemplary embodiment.

Referring now to FIG. 2B, a more detailed flow chart of a process 250 for scheduling aircraft maintenance is shown, according to another exemplary embodiment. Process 250 is shown to include an aircraft's onboard maintenance system (OMS) generating maintenance related data including a fault, alarm, or other information (step 252). As examples of other information, the maintenance related data may include performance data such as the flight speed of the aircraft, the temperature differences experienced by the aircraft, the number of rapid accelerations experienced by the aircraft, the average rotations per second of an aircraft engine, or other aircraft data. Aircraft systems other than or in addition to the OMS may also generate the maintenance related data.

Process 250 is further shown to include the aircraft's OMS providing the maintenance related data to an onboard communications system during flight of the aircraft for wireless transmission to ground-based communications electronics (step 254). As previously noted, any number of intermediate communications devices or networks (e.g., satellites, cellular networks, relays, wireless access points, etc.) may exist between the aircraft's onboard communications system and the intended ground-based communications electronics. The ground-based communications electronics then receive the maintenance related data transmitted from the onboard communications system of the aircraft during flight and provide the data to computing electronics for processing (step 256).

Referring further to FIG. 2B, process 250 is further shown to include, at the computing electronics (or a subsystem in communication therewith), predicting the need for maintenance of one or more aircraft using the data received from the aircraft in flight (step 258). The need for maintenance of the one or more aircraft may be calculated or estimated using an expert system or any other logic or algorithms (e.g., comparing values of the received data to thresholds, applying many received data points to a weighted-multivariable function to determine whether maintenance is now desired, etc.). Predicting the need for maintenance may also include querying the relevant aircraft-based system for additional information. For example, if a fault is initially transmitted from the aircraft to the computing electronics, the computing electronics may query the system that produced the fault for diagnostics information or information that can be used for additional diagnostics. The additional information queried for may include, for example, current input and output values for the system, values or parameters of the system when the fault occurred, historical values, or other state or value information of the aircraft.

Referring now to FIG. 2B, process 250 is further shown to include providing the maintenance related data received from the aircraft to an expert system configured to determine the urgency of maintenance for the aircraft (step 260). Like the predicting step, this step may also include transmitting a query or request for additional information to the aircraft. Urgency may be ranked and expressed by the system in any number of ways. For example, the computing electronics may rank maintenance urgency on three levels (e.g., low, medium, high). In other embodiments, the urgency is expressed in terms of minimum number of additional flight hours before repair and/or with an action rule accompanying the urgency (e.g., zero hours—must land plane to service immediately, three hours—may complete flight if within the three hours, twelve hours—may make one or more additional flight legs prior to maintenance, etc.).

Process 250 is further shown to include receiving, at the expert system, information regarding when and where maintenance resources are available (step 262). The "when and where" information is used by the expert system, in addition to the data received from the in-flight aircraft and information predicted or determined in any previous step, to determine a maintenance schedule for the aircraft that is in flight (step 264). One or more maintenance schedules are updated in response to the determination of step 264.

Figure 3:
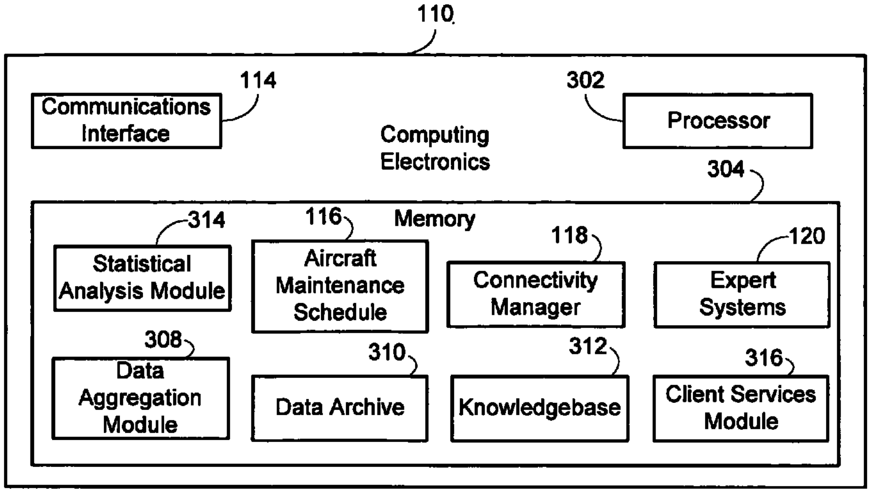
FIG. 3 is a detailed block diagram of the computing electronics of the system for scheduling aircraft maintenance, according to an exemplary embodiment.

Referring now to FIG. 3, a detailed block diagram of the computing electronics of the system for scheduling aircraft maintenance is shown, according to an exemplary embodiment. Computing electronics 110 are shown to include a processor 302 and memory 304. Processor 302 may be a general or specific purpose processor configured to execute computer code or instructions stored in memory 304 or received from other computer readable media (e.g., CDROM, network storage, a remote server, etc.). Memory 304 may be RAM, hard drive storage, temporary storage, non-volatile memory, flash memory, optical memory, or any other suitable memory for storing software objects and/or computer instructions. When processor 302 executes instructions stored in memory 304 for completing the various activities described herein, processor 302 generally causes computing electronics 110 to complete such activities.

In addition to aircraft maintenance schedule 116, connectivity manager 118, and expert systems 120, the block diagram shown in FIG. 3 is shown to include a data aggregation module 308, a data archive 310, a knowledgebase 312, a client services module 316, and a statistical analysis module 314. Data aggregation module 308 is configured to aggregate data from one or more of the inputs to computing electronics 110. For example, data aggregation module 308 may be configured to aggregate maintenance-related information or performance-related information from the plurality of aircraft 102, 104. Data aggregation module 308 may also be configured to aggregate information from, for example, multiple parts inventories or parts inventory systems such as system 122, one or more flight scheduling systems 124, one or more weather systems 126, one or more remote diagnostics systems 128, or from any other combination of external data sources. Data that is aggregated by data aggregation module 308 may be provided to data archive 310 for use by other modules or logic of computing electronics 110. Data archive 310 may be or include one or more relational databases, hash tables, lookup table, ordered list, linked list or other data structure or structures configured to organize and store archived data for retrieval. Knowledgebase 312 is a computer-readable knowledge base configured to store knowledge (e.g., rules, relational information, etc.) to assist deductive reasoning logic of expert systems 120. Knowledgebase 312 may be updated as computing electronics 110's experience changes. For example, if certain parts on an aircraft begin failing sooner than expected, the data aggregation module 308 (or another logic module or process of computing electronics 110) may update the knowledgebase 312 so that expert systems 120's handles or provides warnings relative to the certain parts earlier. Knowledgebase 312 or expert systems 120 may further be supported by statistical analysis module 314. Statistical analysis module 314 may be configured to conduct a detailed statistical analysis of groups of data from a plurality of aircraft. Statistical analysis module 314 may, for example, continually operate on data archive 310 to find trends, correlations, test conclusions, or otherwise. Results from statistical analysis module 314 may be presented to a user via a report or graphical user interface. In other embodiments results from statistical analysis module 314 may be used to update knowledgebase 312, to assist expert systems 120 in making a decision, or by a sorting or ordering feature of aircraft maintenance schedule 116.

Referring further to FIG. 3, client services module 316 may be configured to provide application programming interfaces, web services, remote service invocation features, or any other services for allowing remote devices, clients or processes to communicate with computing electronics 110. For example, maintenance portal system 134 may be configured to communicate with the data and modules of computing electronics 110 via a web service provided by client services module 316. Any of components 116, 118, 120, 308, 310, 312, 314, and 316 may include computer code or instructions executable by processor 302. The computer code may include script code, object code, compilable code, or any other suitable code or instructions.

Referring now to FIG. 4, a block diagram of an aircraft system for use with scheduling systems of the present invention is shown, according to an exemplary embodiment. The aircraft system is shown to be mounted or installed in or on aircraft 102. The aircraft system is shown to include information management system (IMS) 402. Information management system 402 may be configured to conduct data loading from other aircraft systems such as aircraft avionics systems 404, aircraft onboard maintenance systems (OMS) 406, aircraft cabin systems 408, and any other aircraft system via communications connections or networks in the aircraft. For example, aircraft 102 is shown to include avionics network 410 and data communications network 412 which IMS 402 is configured to use. Once data from aircraft systems is received or loaded by IMS 402, then IMS 402 provides the data to wireless communications system 414 (e.g., satellite communications system, radio communications system, etc.) for direct or eventual transmission to a ground-based maintenance system as described in previous Figures or in other embodiments of the present invention.

Referring further to FIG. 4, avionics systems 404 may include aviation electronics for the aircraft including one or more of a cockpit display system, a communications system, a navigation systems, a GPS system, a VOR or LORAN system, a monitoring system, an aircraft flight control systems, a fly-by-wire system, a collision-avoidance system, a weather system, a radar system, an aircraft management system, a tactical avionics system, a military communications system, a sonar system, and/or an electro-optic system. While data from one or more of the avionics systems 404 may be forwarded to a ground-based maintenance system of the present invention by IMS 402 without any or much processing by IMS 402, in other embodiments IMS 402 may be configured to conduct some analysis of data from the various avionics systems 404 (for example, to estimate if a fault exists prior to sending data to the ground).

OMS 406 includes one or more processing devices configured to at least detect and, in some cases, diagnose anomalies or faults of one or more aircraft systems. OMS 406 may include a number of sensors distributed about the aircraft configured to provide signals for interpretation by processing circuitry of OMS 406. OMS 406 may be configured to conduct some of the analysis described above with respect to an expert system on the ground. For example, OMS 406 may analyze sensor input or other aircraft information to determine an urgency or severity parameter and provide the urgency or severity parameter to wireless communications system 414 with descriptive information for use by the ground-based maintenance system or expert system. In some embodiments, OMS 406 may include its own expert systems configured to work in alone or in conjunction with expert systems of the ground-based maintenance system.

Cabin systems 408 may include, for example, an entertainment system, a mapping system for allowing passenger's to view the aircraft's progress on a map, a drink ordering system, or other aircraft systems that are associated with the cabin of the aircraft. Cabin systems 408 (via a master controller or separately) may communicate fault or performance information to data communications network 412 for transmission to IMS 402 and eventual communication via wireless communications system 414. For example, if the aircraft's entertainment system is beginning to provide error codes, those codes may be communicated to the ground-based maintenance scheduling system during flight.

Avionics network 410 is shown as communicably coupling avionics systems 404 and IMS 402. While avionics network 410 is shown as a single network, it should be noted that in various exemplary embodiments, more than one avionics network 410 or bus may be provided in aircraft 102 for providing avionics data to IMS 402. Avionics network 410 may be configured to communicate via one or more standard or proprietary protocols. For example, avionics network 410 may be an aircraft data network, an avionics-full duplex switched Ethernet (AFDX) network, an ARINC network, an IEEE 1394b network, or any other suitable network.

Data communications network 412 may be an Ethernet network, an optical network, a network as described above with respect to avionics network 410, or otherwise. Data communications network 412 is configured to receive data communications from OMS 406, cabin systems 408 or other aircraft systems and to provide the data communications to IMS 402 for transmission via wireless communications system 414.

Interface 417 may be one or more jacks, communications circuits, communications drivers, terminals, or other hardware for joining networks 410, 412 to IMS 402. For example, interface 417 may include an ARINC 429 jack and associated circuitry as well as an Ethernet jack and associated circuitry for receiving communications from both avionics network 410 and data communications network 412.

IMS 402 is shown to include a processor 418 and memory 416. Processor 302 may be a general or specific purpose processor configured to execute computer code or instructions stored in memory 416 or received from other computer readable media (e.g., CDROM, network storage, a remote server, etc.). Memory 416 may be RAM, hard drive storage, temporary storage, non-volatile memory, flash memory, optical memory, or any other suitable memory for storing software objects and/or computer instructions. When processor 418 executes instructions stored in memory 304 for completing the various activities described herein, processor 418 generally causes IMS 402 to complete such activities.

Memory 416 is shown to include a fault detection and diagnostics (FDD) unit 420, a local data log 422, and a performance manager 424. The fault detection and diagnostics unit 420 is configured to analyze inputs received from avionics systems 404, OMS 406, or cabin systems 408 in order to detect or diagnose faults (e.g., errors, alerts, alarms, etc.) provided by systems 404, 406, 408. Fault detection and diagnostics unit 420 may be configured to serve as a "first level" or "first filter" of information from avionics systems 404, 406, and 408. For example, when an alarm is generated by one or more of systems 404, 406, and 408 it may first be provided to fault detection and diagnostics unit 420. Fault detection and diagnostics unit 420 may process the alarm according to one or more algorithms to determine if the alarm is of a severity level that should be reported in flight. In other embodiments, fault detection and diagnostics unit 420 will wait for another instance of the same alarm to determine if the first alarm was merely "noise"—and not something that should be provided to the ground. In other embodiments, fault detection and diagnostics unit 420 is configured to receive an alarm and to actively respond to the alarm with one or more diagnostics routines. The diagnostics routines may request or otherwise gather additional information from the system or systems that generated the alarm. The fault detection and diagnostics unit 420 may then package the alarm with relevant information or unit 420 may be configured to attempt to describe the alarm using its own logic (e.g., by wrapping the alarm with one or more XML tags, etc.) and to send the description to the ground-based maintenance system.

Local data log 422 may be a memory buffer or a log retained on IMS 402 of the information received from systems 404, 406, or 408. Fault detection and diagnostics module 416, performance manager 422, and query service 426 may be configured to operate on data stored in local data log 422. In some embodiments, IMS 402 may be configured to transform data stored within memory 416 and local data log 422 prior to sending the information on to a ground-maintenance station via wireless communications system 414.

Performance manager 424 may be configured to analyze data from systems 404, 406 or 408 for performance reasons or against performance benchmarks. For example, performance manager 424 may be configured to determine whether the navigation performance of the aircraft is within a certain threshold of performance. In other embodiments, performance manager 424 may be configured to receive information (e.g., from other aircraft) against which performance manager 424 compares aircraft 102's performance.

Query service module 426 is configured to provide a service through which a ground-based maintenance system (e.g., including computing electronics 110 or maintenance portal system 134) can query IMS 402. As previously noted, when a fault or other data is detected in one of systems 404, 406, and 408 and communicated to the ground-based maintenance system, the ground-based maintenance system may include one or more process steps that include requesting additional information from the aircraft for use in further diagnostics, expert systems, or scheduling processing. For example, a query may request further information about a fault to determine if the fault is indicating an urgent problem or a problem of reduced importance. The expert systems (e.g., expert systems 120) may be configured to query the aircraft via query service 426 during multiple branches of a process to determine how to update a maintenance schedule. The query service 426 may be a web service, an SQL service, an XML-based service, a proprietary service, a service according to a standard communications protocol, or otherwise.

Figure 5:
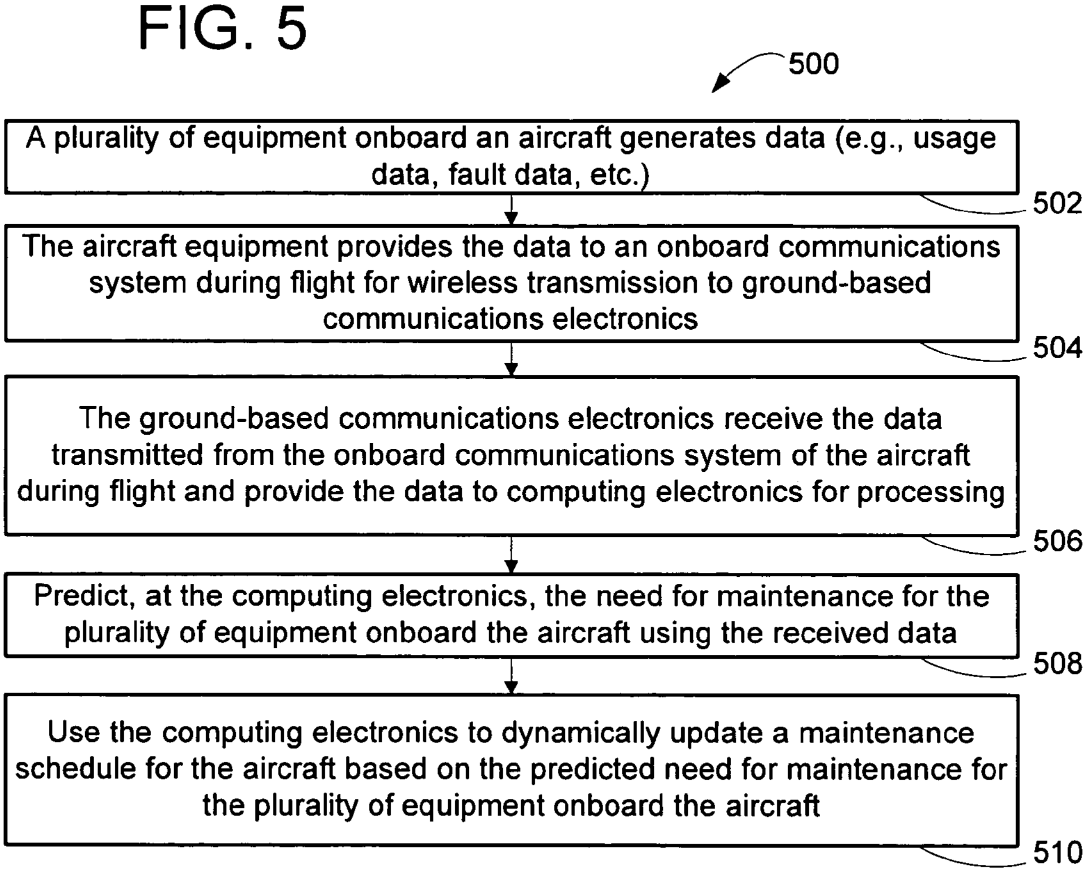
FIG. 5 is a flow chart of a process for scheduling aircraft maintenance, according to another exemplary embodiment.

Referring now to FIG. 5, a flow chart of a process 500 for scheduling aircraft maintenance is shown, according to an exemplary embodiment. Process 500 is shown to include a plurality of equipment onboard an aircraft generating data (e.g., usage information, fault information, etc.) (step 502) and providing the data to an onboard communications system during flight for wireless transmission to ground-based communications electronics (step 504).

Process 500 is further shown to include receiving the data transmitted from the onboard communications system of the aircraft during flight and providing the data to computing electronics for processing (step 506). Process 500 yet further includes predicting, at the computing electronics, the need for maintenance for the plurality of equipment onboard the aircraft using the received data (step 508). The computing electronics then uses the predicted need for maintenance for the plurality of equipment onboard the aircraft to update a maintenance schedule for the aircraft (step 510). The computing electronics may be configured to update the maintenance schedule by adjusting a scheduled maintenance appointment for at least one of the plurality of equipment onboard the aircraft. The computing electronics may be configured to update the maintenance schedule by adding a maintenance task to a "to-do" list (e.g., checklist, etc.) for the next scheduled maintenance appointment based on the received data. The communications electronics and the computing electronics may further be configured to coordinate maintenance schedules for a plurality of aircraft (e.g., by resolving conflicts between schedules for the plurality of aircraft based on data received from aircraft while in flight).

Referring further to FIG. 5, it should be noted that in some embodiments the device on the aircraft may include a processing circuit configured to generate additional information for the aircraft equipment based on logged data prior to sending the data to the ground. For example, a processing circuit in the aircraft may be configured to perform a calculation to generate the additional information including, e.g., a diagnostics calculation, a usage calculation, a statistical model, a fault detection routine, and a thresholding analysis. The processing circuit may further be configured to predict a maintenance need for aircraft equipment based on the calculated additional information. The processing circuit may then cause at least one of the prediction and the calculated additional information to be wirelessly transmitted to the ground-based aircraft maintenance system. In other embodiments, the logged data is not transmitted—only the generated additional information (e.g., a suggested maintenance update, a diagnostics conclusion, etc.).

In yet another embodiment of the invention the predicting and maintenance schedule updating steps are conducted by computing electronics onboard an aircraft and the updated maintenance schedule is communicated to ground-based systems for synchronization or use (e.g., by a maintenance manager system, etc.).

It should be noted that while many of the systems and methods described herein are mentioned as conducting wireless data communications while the aircraft is in flight, in the same systems and methods or in alternative systems and methods the data communications may be conducted while the aircraft is on the ground (e.g., via wired and/or wireless communications). Yet further, it should be noted that the systems and methods described herein for predicting service needs or updating maintenance schedules may be provided to a single aircraft (e.g., using data from a plurality of aircraft subsystems or equipment) or for a plurality of aircraft (e.g., to coordinate maintenance activities across a fleet.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for scheduling aircraft maintenance, comprising:

communications electronics configured to receive first data generated by a plurality of equipment onboard an aircraft, to receive second data generated by the plurality of equipment onboard the aircraft in response to a query, the communications electronics configured to receive the data while the aircraft is in flight; and computing electronics configured to receive the first data from the communications electronics, to generate the query based on the received first data, to receive the second data from the communications electronics, and to update a maintenance schedule based on the received first data and second data, the maintenance schedule comprising a scheduled maintenance appointment for each of the plurality of equipment for the aircraft, wherein the computing electronics comprise an expert system configured to predict a need for maintenance of the aircraft based on the received first data and second data.

2. The system of claim 1, wherein the computing electronics are configured to update the maintenance schedule by adjusting a scheduled maintenance appointment for at least one of the plurality of equipment onboard the aircraft.

3. The system of claim 1, wherein the computing electronics are configured to update the maintenance schedule by adding a maintenance task to a to-do list for the next scheduled maintenance appointment based on the received data.

4. The system of claim 1, wherein at least one of the first data and the second data comprises usage information for the plurality of equipment.

5. The system of claim 1, wherein the plurality of equipment relates to a plurality of aircraft subsystems.

6. The system of claim 1, wherein the communications electronics and the computing electronics are configured to coordinate maintenance schedules for a plurality of aircraft.

7. The system of claim 6, wherein coordinating maintenance schedules for a plurality of aircraft comprises resolving conflicts between schedules for the plurality of aircraft based on the data received from aircraft while in flight.

8. The system of claim 1, wherein the computing electronics are further configured to predict the lifespan of the equipment by applying the received data to statistical models.

9. The system of claim 8, wherein the computing electronics are configured to update predictions using new data received from the aircraft and by applying the statistical models.

10. A system for scheduling aircraft maintenance, comprising:

communications electronics configured to receive first data from systems onboard a plurality of aircraft while the aircraft are in flight, to transmit a query for second data to the systems onboard the plurality of aircraft, and to receive second data from the systems onboard the plurality of aircraft while the aircraft are in flight; and computing electronics configured to receive the first data from the communications electronics, to generate the query based on the received first data and to transmit the query to the communications electronics, to receive the second data from the communications electronics, and to update a maintenance schedule for the plurality of aircraft based on the received first data and second data, wherein the computing electronics comprise an expert system configured to predict a need for maintenance of the aircraft based on the received first data and second data.

11. The system of claim 10, wherein the computing electronics are further configured to receive maintenance resource availability information and to update the maintenance schedule for the plurality of aircraft based on the maintenance resource availability information.

12. The system of claim 11, wherein the maintenance resource availability information comprises information regarding the location of human resources and repair parts needed for the aircraft.

13. The system of claim 10, wherein the computing electronics are further configured to predict the lifespan of aircraft systems and components based on statistical models.

14. The system of claim 13, wherein the computing electronics are configured to update predictions using the data received from the aircraft and by applying the statistical models.

15. The system of claim 13, wherein the computing electronics are further configured to update the statistical models based on the data received from a plurality of systems onboard the in-flight aircraft.

16. The system of claim 10, wherein the computing electronics are further configured to determine the severity of a fault on the aircraft based on the received data.

17. The system of claim 10, wherein the computing electronics are further configured to determine a plan for providing the maintenance according to the updated maintenance schedule and wherein the plan comprises an update to an airline flight schedule.

18. The system of claim 10, wherein the computing electronics are configured to update the maintenance schedule prior to the aircraft landing and wherein the computing electronics are configured to provide information about how the maintenance schedule has been updated for the aircraft to the communications electronics for transmission to the aircraft.

19. A method for scheduling aircraft maintenance, comprising:

using communications electronics to receive data from systems onboard a plurality of aircraft while the aircraft are in flight;

providing the received data to computing electronics;

generating a query for additional data from systems onboard the plurality of aircraft, based on the received data;

using an expert system configured to predict a need for maintenance of the aircraft based on the received data and additional data; and using the computing electronics to update a maintenance schedule for the plurality of aircraft based on the received data and additional data.

20. The method of claim 19, further comprising:

at the computing electronics, receiving maintenance resource availability information; and updating the maintenance schedule for the plurality of aircraft based on the maintenance resource availability information.

21. The method of claim 20, wherein the maintenance resource availability information comprises information regarding the location of human resources and repair parts needed for the aircraft.

22. The method of claim 19, further comprising:

predicting the lifespan of aircraft systems and components based on statistical models.

23. The method of claim 19, further comprising:

processing the data received from the plurality of the aircraft to assign an urgency parameter to at least one maintenance activity for each of the plurality of aircraft; and wherein updating the maintenance schedule for the plurality of aircraft is based at least partially on a ranking of the aircraft by urgency parameter.

24. The method of claim 19, further comprising:

determining the severity of a fault on the aircraft based on the received data.

25. The method of claim 19, further comprising:

determining a plan for providing the maintenance according to the updated maintenance schedule and wherein the plan comprises providing an update to an airline flight schedule.

26. A device for mounting in an aircraft, the device comprising:

a first interface to avionics systems;

a second interface to an onboard maintenance system;

a third interface to wireless data communications electronics; and a processing circuit configured to log data available at the first and second interfaces, to cause the wireless data communications electronics to wirelessly transmit the logged data to a ground-based aircraft maintenance system during flight, to cause the wireless data communications electronics to wirelessly transmit queried data in response to a query received from the ground-based aircraft maintenance system and based on the logged data, to generate additional information for aircraft equipment based on the logged data and the queried data, and at least one of a diagnostics calculation, a usage calculation, a statistical model, a fault detection routine, and a thresholding analysis, and to predict a maintenance need for aircraft equipment based on the calculated additional information.

27. The device of claim 26, wherein the processing circuit is further configured to cause at least one of the prediction and the calculated additional information to be wirelessly transmitted to the ground-based aircraft maintenance system.

* * * * *